United States Patent [19]
Robinson

[11] Patent Number: 5,977,932
[45] Date of Patent: Nov. 2, 1999

[54] SELF-DEPLOYING HELICAL STRUCTURE

[75] Inventor: Anthony D. Robinson, Leesburg, Va.

[73] Assignee: Orbital Sciences Corporation, Dulles, Va.

[21] Appl. No.: 08/896,728

[22] Filed: Jul. 18, 1997

Related U.S. Application Data

[63] Continuation of application No. 08/561,216, Nov. 13, 1995, abandoned, which is a continuation of application No. 08/192,324, Feb. 4, 1994, abandoned.

[51] Int. Cl.$^6$ ................................................ H01Q 1/36
[52] U.S. Cl. ............................................. 343/895; 16/226
[58] Field of Search .................................... 343/881, 895, 343/897; 16/226, 277; 29/173

[56] References Cited

U.S. PATENT DOCUMENTS

| | | | |
|---|---|---|---|
| 2,763,003 | 9/1956 | Harris | 343/895 |
| 2,840,199 | 6/1958 | Marris | 343/880 X |
| 3,059,322 | 10/1962 | Teague | 343/897 X |
| 3,278,938 | 10/1966 | Rosenthal | 343/880 |
| 3,343,573 | 9/1967 | Dillon | 29/173 X |
| 3,702,481 | 11/1972 | Koller et al. | 343/895 X |
| 3,739,538 | 6/1973 | Rubin | 343/881 |
| 3,836,979 | 9/1974 | Kurland et al. | 343/895 X |
| 3,906,509 | 9/1975 | DuHamel | 343/895 |
| 3,913,109 | 10/1975 | Owen | 343/895 X |
| 4,068,238 | 1/1978 | Acker | 343/895 |
| 4,163,981 | 8/1979 | Wilson | 343/895 X |
| 4,587,777 | 5/1986 | Vasques et al. | 343/880 X |
| 4,658,265 | 4/1987 | Heinze et al. | 343/881 X |
| 4,780,726 | 10/1988 | Archer et al. | 343/840 X |
| 4,780,727 | 10/1988 | Seal et al. | 343/895 |
| 4,784,700 | 11/1988 | Stern et al. | 136/248 |
| 4,821,390 | 4/1989 | Seyler | 29/173 |
| 4,918,884 | 4/1990 | Okazaki et al. | 52/108 |
| 5,138,331 | 8/1992 | Josypenko | 343/895 |
| 5,170,176 | 12/1992 | Yasunaga et al. | 343/895 |
| 5,191,352 | 3/1993 | Branson | 343/895 |
| 5,194,873 | 3/1993 | Sickles | 342/374 |
| 5,196,857 | 3/1993 | Chiappetta et al. | 343/881 |
| 5,198,831 | 3/1993 | Burrell et al. | 343/895 |
| 5,204,981 | 4/1993 | Karasawa et al. | 455/277.1 |
| 5,215,824 | 6/1993 | Munro et al. | 428/473.5 |
| 5,234,761 | 8/1993 | Barnes et al. | 428/336 |
| 5,255,005 | 10/1993 | Terret et al. | 343/895 |
| 5,313,221 | 5/1994 | Denton, Jr. | 343/881 X |

FOREIGN PATENT DOCUMENTS

| | | | |
|---|---|---|---|
| 0195553 | 9/1986 | European Pat. Off. | B64G 1/24 |
| 2596205 | 9/1987 | France | H01Q 1/08 |
| 9115621 | 10/1991 | WIPO | H01Q 1/36 |

OTHER PUBLICATIONS

Allen Das, "Helix Antenna for Spacecraft," *The Radio and Electronic Engineer*, pp. 237–240, Apr. 1969.

Kraus, *Antennas*, Chapter 7—"The Helical Antenna," pp. 265–339, 1988.

*Primary Examiner*—Don Wong
*Assistant Examiner*—Tho Phan
*Attorney, Agent, or Firm*—Jenner & Block

[57] ABSTRACT

A helical antenna structure is deformable and capable of being stowed in a small volume. At deployment, the helical antenna structure uses the stored strain energy in its resilient helices to revert to its original shape without the use of any outside force. Multiple antenna structures can be linked using a plurality of resilient lenticular shaped hinges.

16 Claims, 10 Drawing Sheets

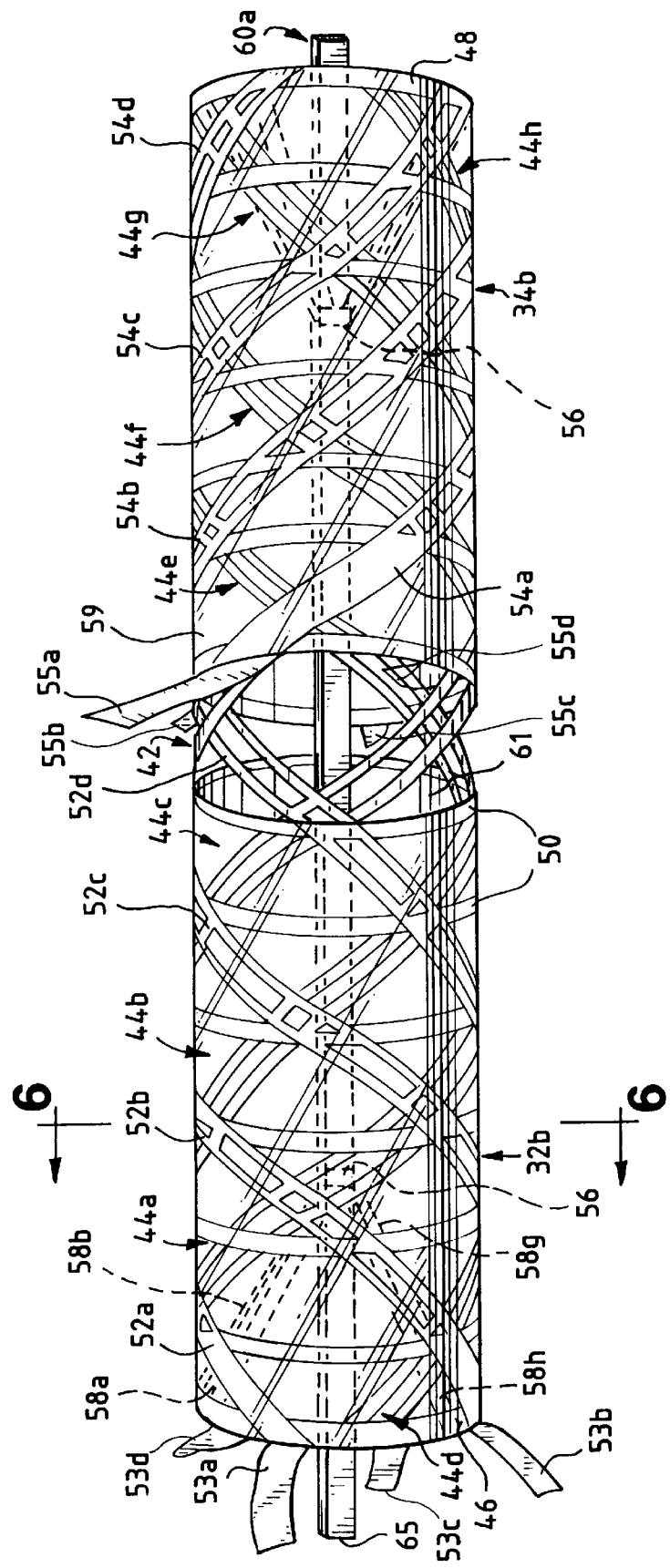

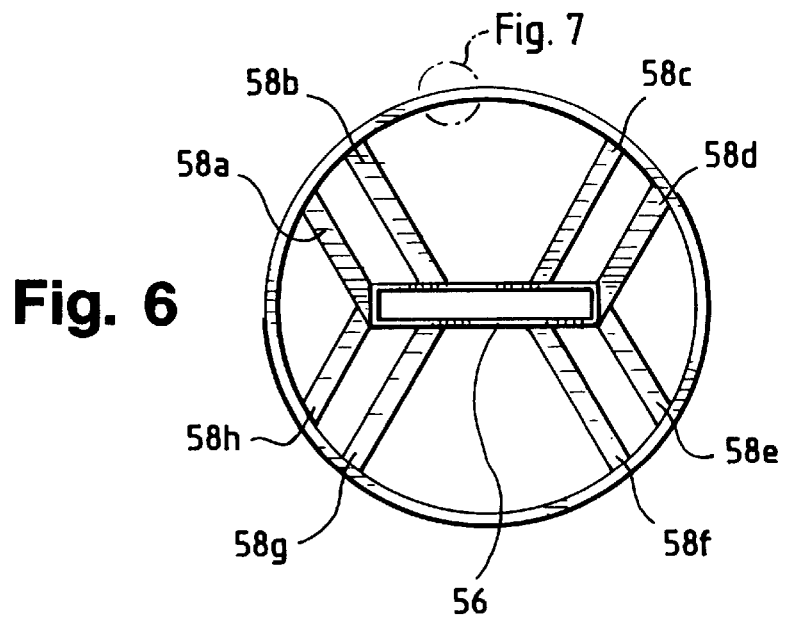
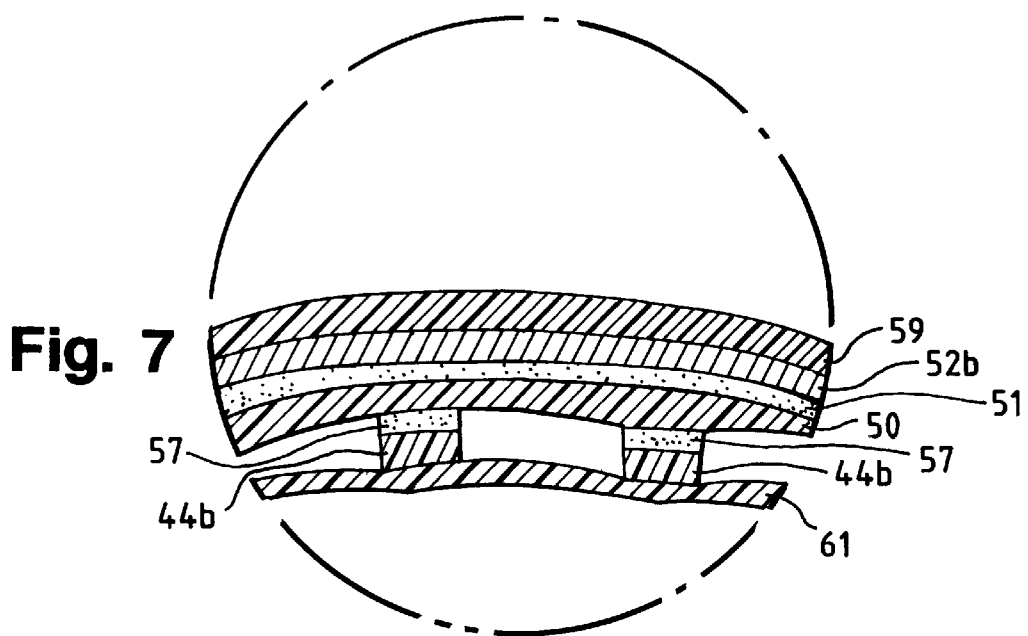

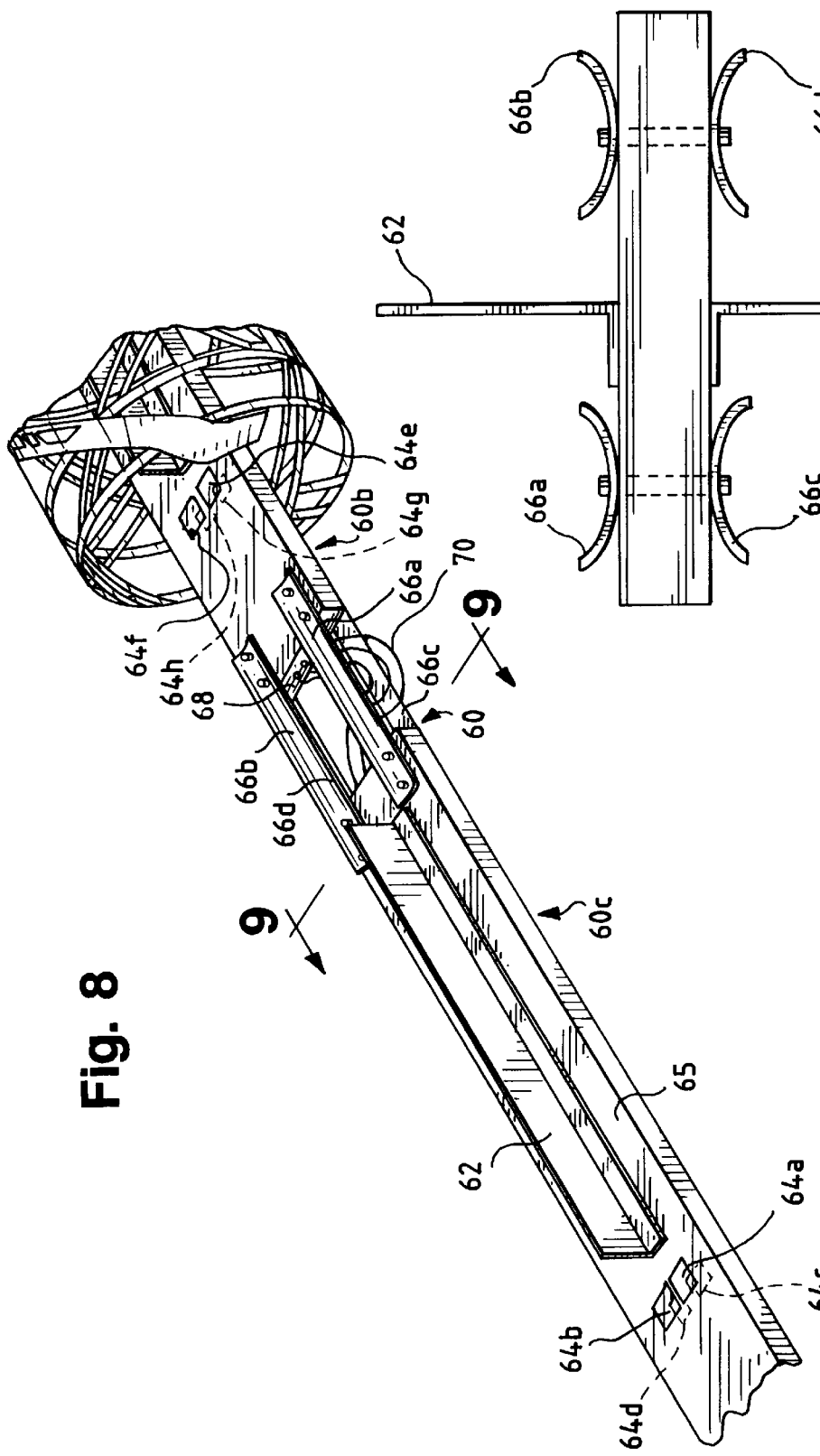
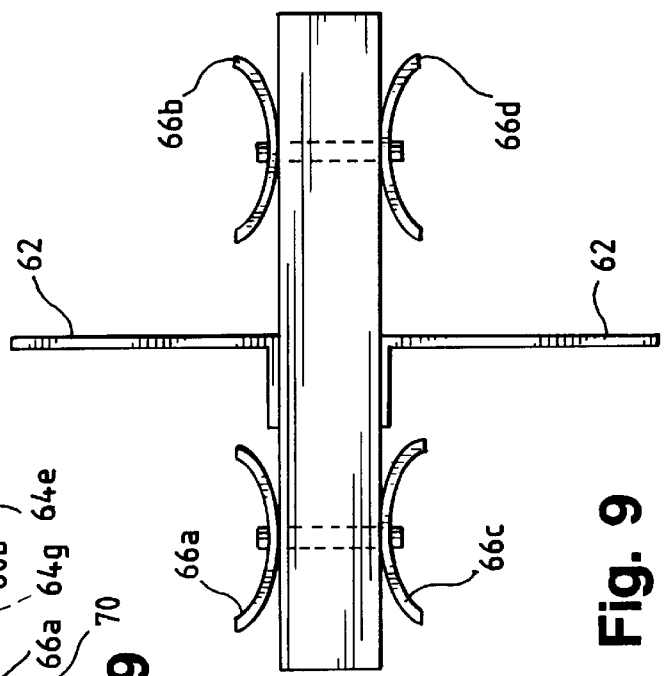
Fig. 8
Fig. 9

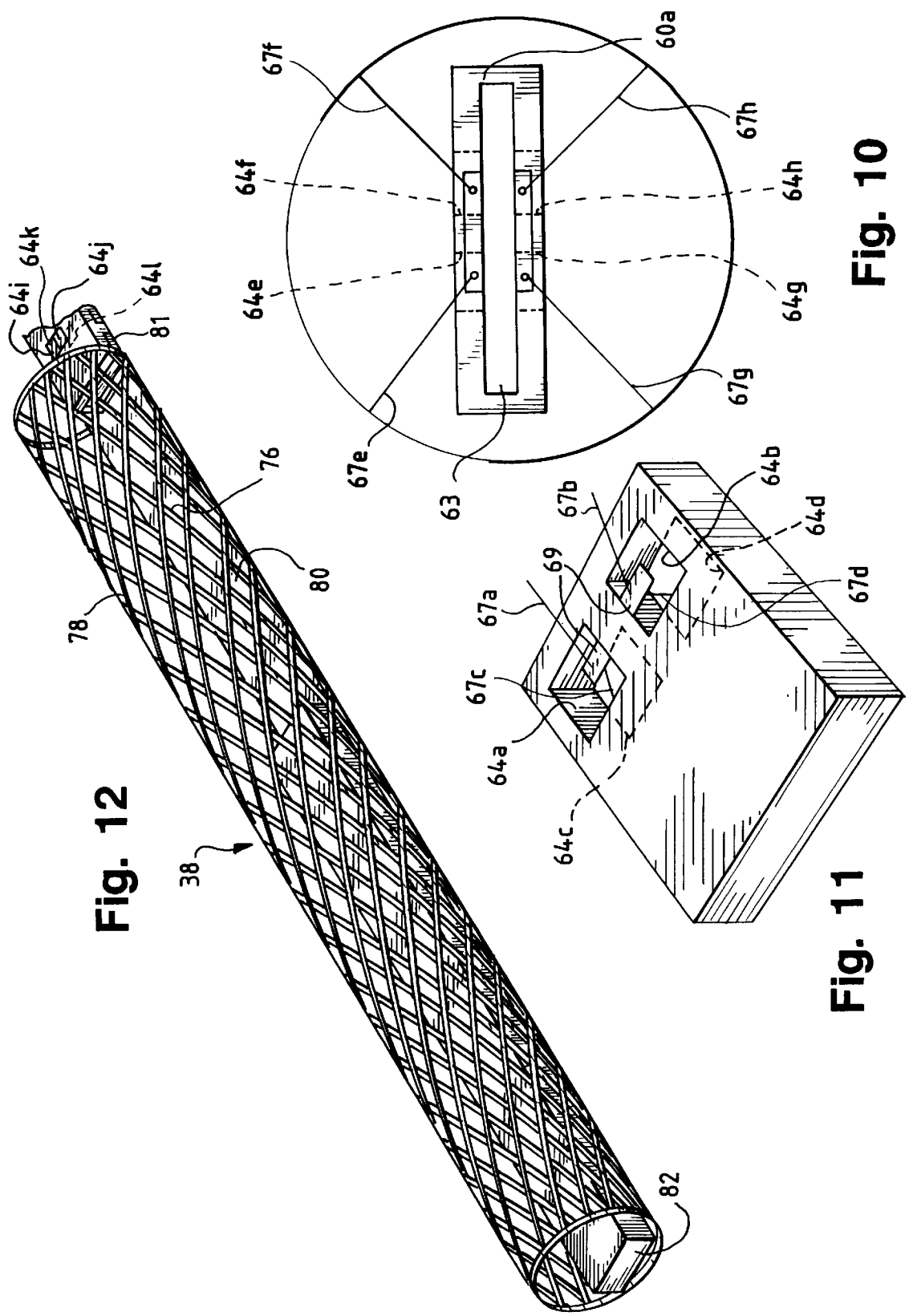

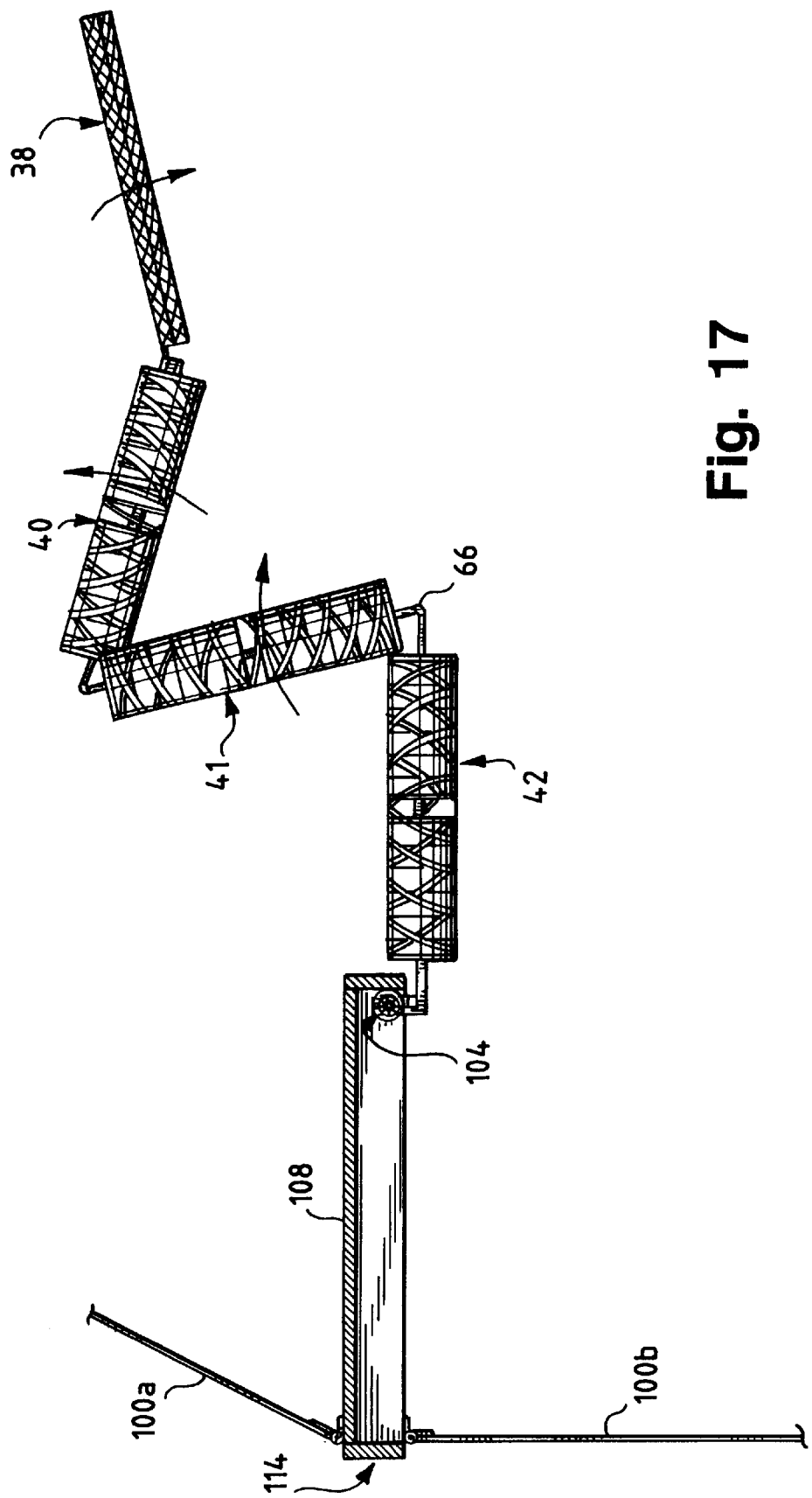

SELF-DEPLOYING HELICAL STRUCTURE

This application is a continuation of application Ser. No. 08/561,261, filed Nov. 13, 1995 which is a cont of Ser. No. 08/192,324 filed Feb. 4, 1994.

BACKGROUND OF THE INVENTION

1. Field of the Invention

The invention relates generally to self-deploying, helical structures and more particularly to a self-deploying helical structure employed as an antenna.

2. Description of the Related Art

Helical antennae are generally well-known in the art. While some helical antennae are designed to be permanent and stationary in their operating configuration, it is often desirable to have an antenna capable of being transported and then deployed into its extended operating configuration. Thus, many attempts have been made to design helical antennae capable of being collapsed and transported and then deployed into the extended operating configuration.

For example, U.S. Pat. No. 3,836,979 to Kurland et al. for a "Lightweight Deployable Helical Antenna" discloses a helical antenna coiled about a longitudinally extendable and contractible supporting structure comprising a truss frame constructed of resiliently flexible strain energy beams. The antenna is collapsible to a relatively compact configuration for stowage and erects automatically, when released, under the force of the strain energy stored in the antenna beams.

U.S. Pat. No. 4,068,238 to Acker for an "Elastic Strain Energy Deployable Helical Antenna" also discloses a helical antenna having a tubular resiliently flexible antenna element fixed at one end to a support and formed into a normally extended, resiliently compressible helix. The antenna includes a plurality of flexible tension members of shorter overall length than the axial length of the helix if the helix were allowed to become fully extended. The flexible tension members are fixed at one end to the support, extend axially of the helix, and are secured to its helical turns. The antenna is compressible axially for storage and is deployable axially by stored elastic strain energy to an extended operating length at which the tension members are stressed in tension by the helix to reinforce the latter against deflection laterally of its longitudinal axis.

U.S. Pat. No. 4,780,727 to Seal et al. for a "Collapsible Bifilar Helical Antenna," discloses a bifilar helical antenna wound about a rigid mast and a plurality of support arms. The support arms are slidable along the axis of the mast to allow for expansion and contraction of the helices. The mast includes multiple sections which can be added or removed to permit adjustment of the axial length of the mast.

U.S. Pat. No. 3,059,322 to Teague for a "Method of Making a Collapsible Antenna of Wire Mesh" discloses a collapsible antenna which can be rolled and unrolled manually into, respectively, a collapsed and extended condition. The antenna, which is not a helical antenna, is constructed of wire mesh.

While these antennae may be stored in a smaller volume in their collapsed state than in their deployed configuration, none provides the flexibility and compactness of the present invention. Moreover, unlike the antenna of the present invention, the helical antennae described in the foregoing patents, among other things, are only capable of longitudinal contraction. While such antennae may be acceptable for helical antennae being deployed on Earth, they are not adapted for automatic deployment from a compactly stowed to extended position on a spacecraft in space. Typically, a spacecraft deployable structure requires a mechanical means, such as a separate spring or motor, to supply the requisite motive force to extend the antenna from its collapsed state. Any mechanical failure results in such antenna not being properly deployed. Thus, a self-deploying antenna not susceptible to such mechanical failure is desirable.

SUMMARY AND OBJECTS OF THE INVENTION

It is a general object of the present invention to provide a self-deploying, helical structure.

It is a more precise object of the present invention to provide a helical structure capable of being partially crumpled into a compact volume for storage and of self-deploying using energy stored in the crumpled helical structure.

Another primary object of the present invention is to provide a highly reliable, helical antenna that does not require any external energy to deploy it from a collapsed to a fully extended configuration.

These objects are accomplished in the present invention by a helical structure capable of being stowed in a rolled-up or other distorted configuration occupying a compact volume. The helices comprise resilient strips having one end attached to a top ring and the other end attached to a bottom ring. Intermediate rings are included throughout the length of the structure for added stability.

The resilient strips are placed around an aluminum mandrel in the desired helical configuration. The strips are attached at each of their ends to an end ring. Intermediate rings are attached around the resilient helical strips to help hold the helical strips in their desired spaced relationship. The apparatus then is heated and allowed to cool before it is removed from the mandrel. This heating and cooling process causes the helical strips to retain their shape. Conductive strips are attached to some or all of the resilient strips to form the antenna.

The entire helical structure can be rolled up or its normal configuration otherwise distorted for storage in a compact volume. Later, when released, the structure is self-deployed by the energy stored in the resilient helical strips as they resume their helical configuration. Thus, once released from its stowed position, no external means is required to deploy the structure into its extended configuration.

In a second embodiment, an antenna assembly includes several resilient helical structures, each of which has a boom segment extending axially the length thereof, with each pair of adjacent ends of the boom segments being joined together by flexible "tape" hinges. The "tape" employed has a configuration and resiliency analogous to that of a carpenter's metal measuring tape. The helical structures can be folded so that they overlie one another by deforming the tape hinges. The antenna assembly thus can be both folded and deformed for stowage in a spacecraft. Once the antenna assembly is released for deployment, the helical structures return to their original shape and the tape hinges "lock" into place so as to align the helical structures.

BRIEF DESCRIPTION OF THE DRAWINGS

FIG. 5 is a perspective view of one of the antenna elements shown in FIG. 4;

FIG. 6 is a section view taken along line 6—6 of FIG. 5;

FIG. 7 is an enlarged view of the circled portion of FIG. 6;

FIG. 8 is a perspective view of a boom design for use with the present invention;

FIG. 9 is a section view of a boom and hinge assembly taken along line 9—9 of FIG. 8;

FIG. 10 is a section view of a boom segment showing feed holes and feeds therein;

FIG. 11 is a schematic view of a boom segment showing feed holes and feeds therein;

FIG. 12 is a perspective view of a UHF antenna shown in FIG. 4;

FIG. 17 is a section view of the antenna system of FIG. 14 deploying toward its extended configuration at a time after that shown in FIG. 16.

DETAILED DESCRIPTION OF THE PREFERRED EMBODIMENT

Figure 1:
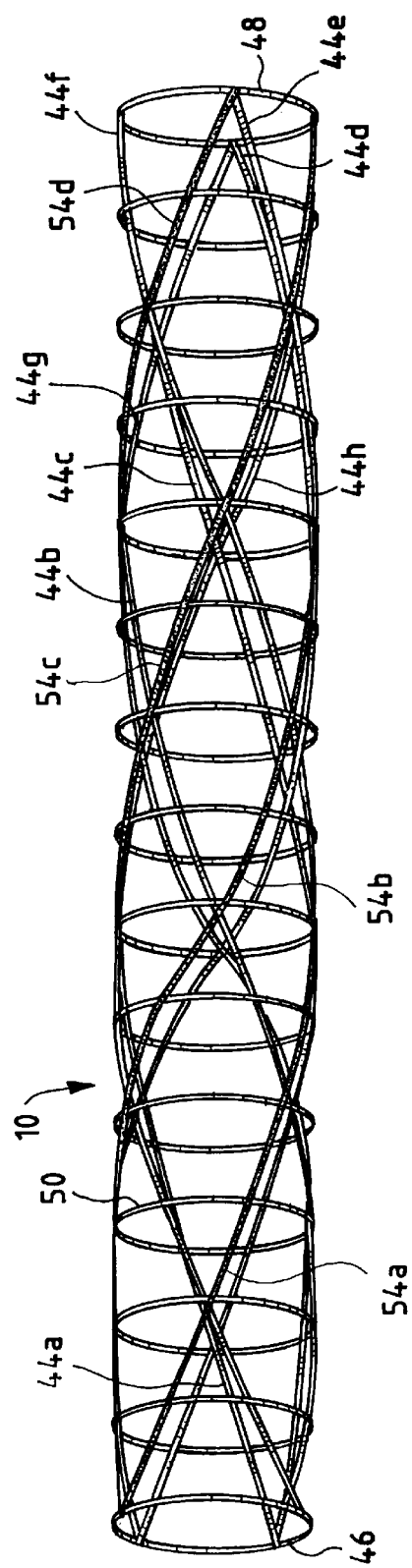
FIG. 1 is a perspective view of a helical antenna of the present invention in its deployed position.

Referring to FIG. 1, an antenna 10 is shown. Antenna 10 has resilient helical strips 44a–h, conductive strips 54a–d, top ring 46, bottom ring 48 and intermediate rings 50.

Antenna 10 of FIG. 1 includes eight resilient helical strips 44a–h. Resilient helical strips 44a–h can be made of, for example, "S"-Glass/PEEK (Poly Ether Ether Ketone). The resiliency of this material allows antenna 10 to be rolled up or otherwise distorted from its normal configuration to fit into a compact volume and later to self-deploy. Conductive strips 54a–d are applied to some or all of resilient helical strips 44a–h by means of a pressure sensitive adhesive. Conductive strips 54a–d can be made of gold, copper, or other suitable conductive material as is known in the art.

A quadrifilar antenna employs four conductive strips 54a–d. Alternatively, as shown in FIG. 5, a portion of the helical structure can include four conductive strips 54a–d wound so as to provide right hand polarization, and a second portion can include four conductive strips 52a–d wound so as to provide left hand polarization, thereby providing two antennae of opposite polarizations. A single polarization quadrifilar embodiment is shown in FIG. 1. Antenna 10 includes a top ring 46 at one end to which an end of each of resilient helical strips 44a–h is attached. On the opposite end of antenna 10, a bottom ring 48 is attached similarly to the opposite end of each of resilient helical strips 44a–h. Intermediate rings 50 are attached around resilient helical strips 44a–h in order to maintain the helical shape of antenna 10 when in its deployed, extended configuration. In the preferred embodiment, intermediate rings 50 are placed around each intersection of helical strips 44a–h as well as around the midpoint between successive intersections of helical strips 44a–h.

In FIG. 1, conductive strips 54a–d are wound so as to overlie four helical strips 44a–d travelling around the mandrel in the same direction (i.e., forming either a right-handed or left-handed helix, depending upon the desired antenna polarization). Conductive strips 54a–d are wound spaced 90° apart. In the alternative embodiment discussed above and shown in FIG. 5, conductive strips can be wound in both directions (i.e., some conductive strips 54a–d forming a right-handed helix and some conductive strips 52a–d forming a left-handed helix).

Antenna 10 is constructed by first placing top ring 46 and bottom ring 48 around an aluminum mandrel. Resilient helical strips 44a–h are wound around the mandrel and attached at their ends to top ring 46 and bottom ring 48. In the antenna of FIGS. 1 and 5, four resilient helical strips 44a–d spaced 90° apart are wound in one direction to form a right-handed helix and the other four resilient helical strips 44e–h spaced 90° apart are wound in the opposite direction to form a left-handed helix. Intermediate rings 50 are attached to the exterior of resilient helical strips 44a–h to help hold helical strips 44a–h in their desired relationship and to maintain a cylindrical shape. In the preferred embodiment, top ring 46, bottom ring 48 and intermediate rings 50 are identical and are made of the same material as resilient helical strips 44a–h.

In the preferred embodiment, this entire structure is heated, first to 730° F. for 20 minutes under vacuum (approximately 28 inches of mercury), then at 600° F. for 30 minutes. Finally, the structure is cooled to 170° F. before releasing the vacuum. This process causes resilient helical strips 44a–h to retain their shape after being allowed to cool and being removed from the mandrel. Conductive strips 54a–d (and 52a–d in the FIG. 5 embodiment) are then attached to form the antenna or antennae.

Figure 3:
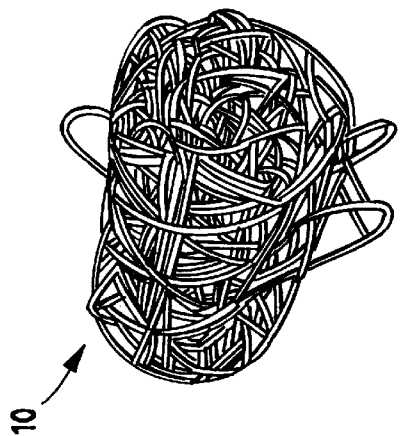
FIG. 3 is a schematic view of the helical antenna of FIG. 1 in its completely rolled up position for stowage.
Figure 2:
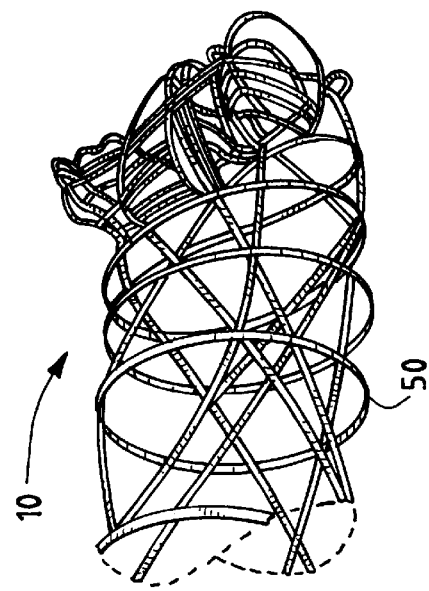
FIG. 2 is a schematic view of a portion of the helical antenna of FIG. 1 beginning to be rolled up.
Figure 14:
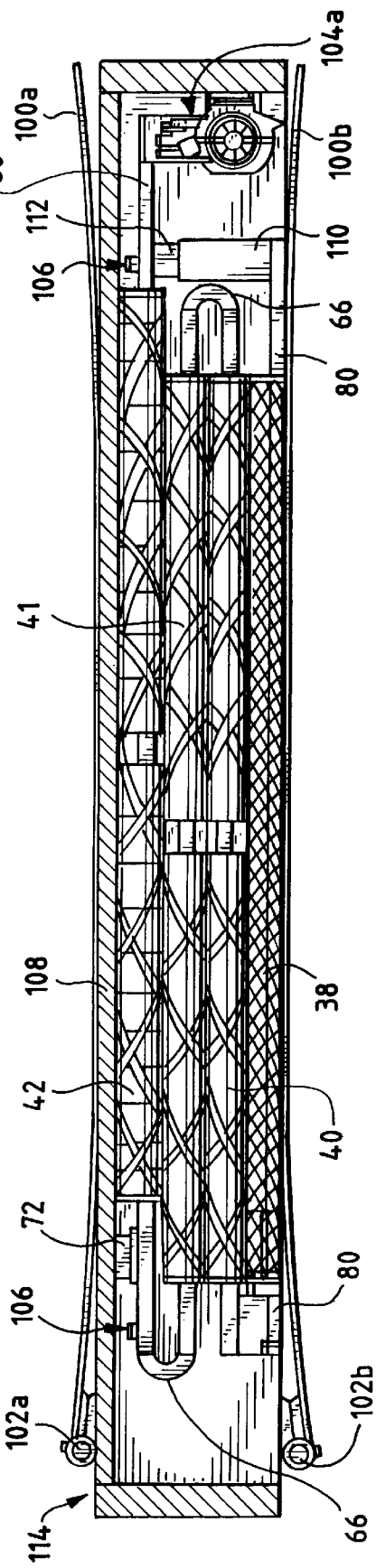
FIG. 14 is a section view of the antenna system of FIG. 4 stowed within a spacecraft.

When finished, antenna 10 is flexible and lightweight and can be stored in a compact volume. For example, antenna 10 can be rolled up from top ring 46 to bottom ring 48, such that top ring 46 is in the center and bottom ring 48 is on the outer surface, i.e., in a coil configuration. FIGS. 2 and 3, respectively, schematically show antenna 10 partially rolled and completely rolled. In addition, antenna 10 can be stowed in a partially squashed configuration to reduce its thickness, as shown in FIG. 14.

Antenna 10 is especially useful in spacecraft applications in which payload space is at a premium. Antenna 10 requires a minimum of space because it can be rolled or otherwise deformed from its normal configuration to fit into a compact or irregular volume. When it is desired to deploy antenna 10 into its extended configuration, antenna 10 self-deploys without the use of any external force by simply releasing the energy stored in the resilient strips 44a–h at the time they were rolled up or otherwise deformed. Because no moving parts are required for deployment into the extended configuration, once antenna 10 is released from the rolled-up or other deformed position in which it is stowed, deployment of antenna 10 is extremely reliable.

In the embodiment shown in FIG. 1, the helical structure serves as a helical antenna. It should be recognized, however, that the helical structure can be used in many applications other than as an antenna. For example, the helical structure can be covered with suitable material, e.g., polytetrafluoroethylene (PTFE), and used as a solar sail for positioning a satellite while in orbit. Another possible use of the helical structure is to support a tip mass and thereby provide a gravity gradient boom. By extending the boom, a satellite's orientation with respect to the Earth can be stabilized, as is known in the art.

In addition, the self-deploying, helical structure of the present invention could be used in a variety of applications on Earth where it is desirable to have a support member that can be stored compactly and that is self-deploying.

Figure 4:
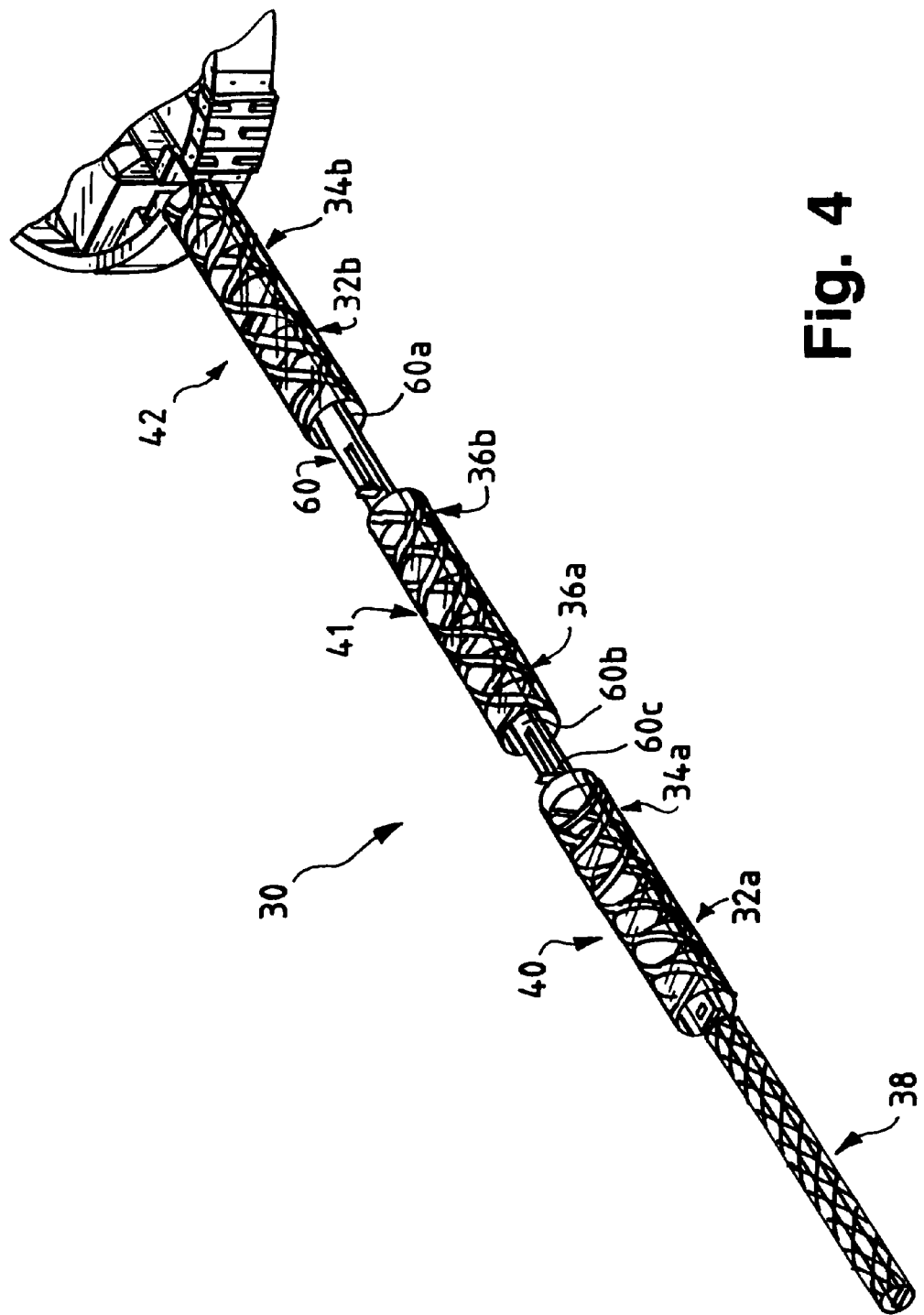
FIG. 4 is a schematic view of a second embodiment of the present invention shown in its deployed position and attached to a spacecraft.

An alternative embodiment, shown in FIG. 4, uses an arrayed approach. A detailed disclosure of this arrayed approach is described in the co-pending U.S. patent application, the contents of which are hereby incorporated by reference, entitled "An Axially Arrayed Helical Antenna," Ser. No. 08/191,247, filed Feb. 4, 1994, and assigned to the same assignee as the present invention. An antenna assembly 30 comprises first and second helical array antennae, comprising, respectively, array elements 32a,b and 34a,b. Antenna assembly 30 also comprises third and fourth antennae 36a and 36b, which are mounted on either half of a helical structure 41 of the same type as shown in FIG. 5. Third and fourth antennae 36a and 36b can be of opposite polarity by having the four conductors on the left half overlying helical strips wound with a right-handed pitch and the four conductors on the right half overlying helical strips wound with a left-handed pitch, or vice-versa.

The first antenna comprises antenna array elements 32a,b both of which are left-handed quadrifilar helices. The second antenna comprises antenna array elements 34a,b both of which are right-handed quadrifilar helices. Antenna array elements 32a and 34a are physically located on a helical structure 40 and antenna array elements 32b and 34b are physically located on a helical structure 42.

It should be recognized that the helical structure of the present invention can be used to support antennae of more or fewer than four conductors, as desired for a particular application.

Helical structure 42 is a resilient helix comprising four "S"-Glass/PEEK resilient strips 44a–d and four counter-wound "S"-Glass/PEEK resilient strips 44e–h. As shown in FIG. 5, each of strips 44a–h may actually comprise two closely spaced strips to allow for lighter weight and increased resiliency. Resilient helical strip 44a is parallel to strips 44b–d and spaced physically apart 90° from adjacent strips 44b,d. Each of resilient helical strips 44b–d has a corresponding relationship with the other strips. Resilient helical strips 44e–h are wound in the opposite direction of strips 44a–d. Each of resilient helical strips 44e–h is parallel to the others and spaced physically 90° apart from the two adjacent strips.

Resilient helical strips 44a–h are joined to end rings 46 and 48 and intermediate rings 50 using a suitable adhesive 57, as illustrated in FIG. 7. End rings 46 and 48 and intermediate rings 50 also are made of "S"-Glass/PEEK. Copper strips 52a–d and 54a–d are attached to the exterior of resilient strips 44a–h, end rings 46 and 48 and intermediate rings 50 using an adhesive 51, e.g., thermoplastic silicone adhesive, which can be a backing on the copper strips, as shown in FIG. 7, to form antenna array elements 32b and 34b. Copper strips 52a–d and 54a–d are preferably as wide as resilient helical strips 44a–h. Where resilient strips 44a–h are each made from two closely spaced strips, copper strips 52a–d and 54a–d preferably are wide enough to reach the outer edges of the two closely spaced strips, and the portions of copper strips 52a–d and 54a–d that are not overlying a portion of "S"-Glass/PEEK structure are removed. This removal of portions of copper strips 52a–d and 54a–d reduces the weight of the antenna system without causing any significant change in the electrical characteristics of copper strips 52a–d and 54a–d. Each of copper strips 52a–d and 54a–d includes a reflective portion 53a–d and 55a–d, respectively, which is trimmed appropriately to improve the signal pattern.

A layer 59 about 2 millimeters thick of PTFE or other suitable gathering means can cover antenna array elements 32b and 34b to provide further structural support or to allow the antenna system to be used as a solar sail, for example. A layer 61 of Kapton or other suitable Mylar or polyester film can cover the interior of antenna array elements 32b and 34b to prevent antenna array elements 32b and 34b from adhering to themselves upon deformation. Layer 59 and layer 61 can be seen most clearly in FIG. 7. For those embodiments using spokes 58a–h to support a boom segment (as described below), spokes 58a–h are bonded to end rings 46 and 48 and therefore layer 61 does not extend to end rings 46 and 48 because layer 61 does not provide an adequate surface for bonding spokes 58a–h.

As most clearly seen in FIG. 6, the interior of antenna array element 32b houses an "S"-Glass/PEEK hub 56 from which eight "S"-Glass/PEEK spokes 58a–h emanate. Spokes 58a–h are attached to end ring 46, for example, in the same manner as rings 46 and 48 are bonded to helical strips 44a–h. A boom segment 60a (shown in FIG. 5, but omitted in FIG. 6 for clarity) is supported by hub 56. A similar hub and spoke arrangement is housed within antenna array element 34b at the other end of the helical structure.

As shown in FIG. 4, a boom 60, comprising boom segments 60a–c, extends axially through antenna array elements 32a,b and 34a,b and antennas 36a,b. Boom segments 60a–c include many common elements. Boom segments 60a–c are constructed from an aluminum beryllium (AlBe) alloy, AlBeMet, having a high "E" and thermal "K". Referring to FIG. 8, four pop-up flaps 62 extend longitudinally along each of boom segments 60a–c to provide RF symmetry. Pop-up flaps 62 are "L"-shaped. The shorter portion of each pop-up flap 62 is bonded to the boom segment using a conductive, e.g., silver filled, epoxy. The longer portion of pop-up flap 62 normally is substantially perpendicular to boom segments 60a–c and will return to its substantially perpendicular orientation after being deformed to rest against boom 60 during stowage.

Pop-up flaps 62 are made from beryllium copper (BeCu) that is preformed to its desired shape and held at 90° F. in a steel die. Pop-up flaps 62 are then heat treated to 625° F. for one hour. A pair of pop-up flaps 62 is provided on the boom segment within each antenna array element 32a,b and 34a,b, and within each antenna 36a,b. For example, antenna 36b is provided with one pop-up flap 62 located on the top of boom segment 60b and another pop-up flap 62 located beneath boom segment 60b. Antenna element 36a also is provided with a pair of pop-up flaps 62 located on boom segment 60b. Thus, each of boom segments 60a–c has attached to it four pop-up flaps 62—two pop-up flaps for each antenna element, with one pop-up flap of each pair above the boom segment and one pop-up flap of each pair below the boom segment.

Referring to FIG. 8, boom segments 60a–c each include eight feed holes 64a–h for connecting each antenna array element 32a,b and 34a,b and each antenna 36a,b to appropriate electrical circuitry (not shown) housed within boom segments 60a–c.

Figure 13:
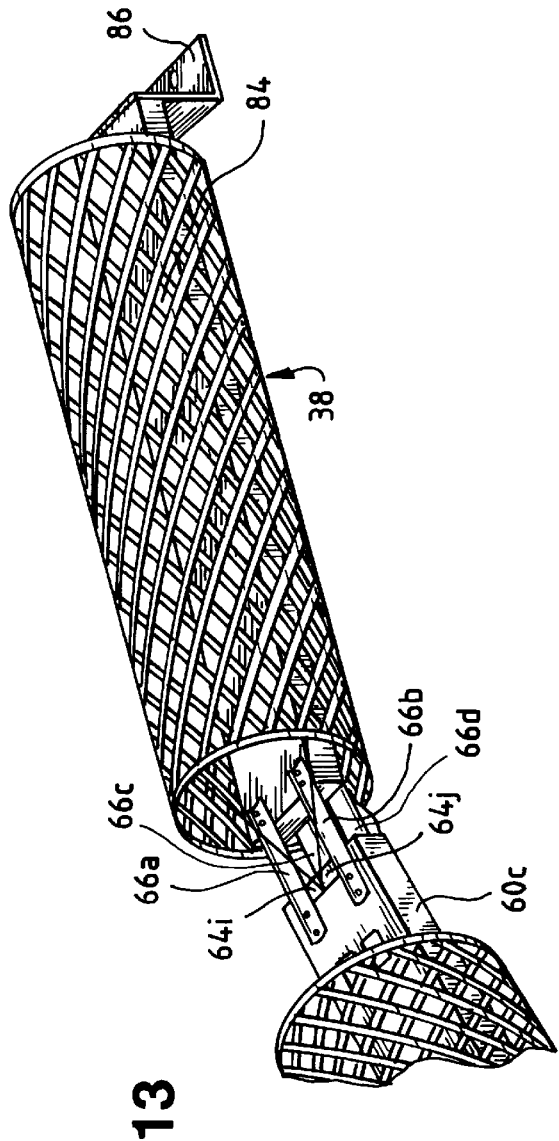
FIG. 13 is a perspective view of an alternative embodiment of a UHF antenna shown in FIG. 4.

Feed holes 64a–d house feeds 67a–d, as shown in FIGS. 10 and 11, for one antenna array element, e.g., 32a, while feed holes 64e–h house feeds 67e–h for the other antenna array element, e.g., 34a. Feeds 67a–h are attached to connector blocks 69. Feed holes 64a,b,e,f are located on top of each boom segment and feed holes 64c,d,g,h are located on the bottom of each boom segment. FIGS. 10 and 11 schematically show the relationship between feed holes 64a–d and feeds 67a–d. As shown in FIGS. 12 and 13, boom segment 60c has an additional set of feed holes 64i–l to feed a UHF antenna 38.

Referring again to FIG. 8, conductive copper foil tape 65 covers boom segments 60a–c for grounding purposes. Tape 65 can be, but need not be, the same type of material used to form the conductive strips of the antenna.

Strips 66a–d made of BeCu form a "tape" hinge, with one end of each strip attached to the end of a first boom segment and the other end attached to a successive boom segment. Such tape hinges are used to join boom segments 60a and 60b and to join boom segments 60b and 60c. Strips 66a–d preferably are bolted to boom segments 60a–c through attachment blocks 68. Strips 66a–d are positioned with a pair of strips 66a,b above successive boom segments 60b and 60c and a pair of strips 66c,d below successive boom segments 60b and 60c. Each of strips 66a–d has a lenticular, i.e., slightly curved, cross-section as shown in FIG. 9. This shape is similar to the shape of a carpenter's metal measuring tape. This shape makes the tape hinges stiff when opened. Strips 66a–d can be bent 180° when antenna assembly 30 is stowed in a satellite. When antenna assembly 30 opens after deployment, the tape hinges lock into opened position and return boom segments 60a–c into an aligned configuration.

Boom segments 60a–c can house within them circuit boards 63 that are attached to attachment blocks 68 having cable connectors. Attachment blocks 68 also facilitate attachment of the "tape" hinges formed from strips 66a–d. Cable service loops 70 are provided at each hinged joint. Boom segment 60a is supported near each end by a hub 56 and spokes 58a–h. Similar hubs and spokes (not shown) support boom segments 60b and 60c. Boom segment 60a also can have, for example, a magnetometer 72 for determining the location of the satellite with respect to the Earth by measuring the Earth's magnetic field.

UHF antenna 38 of FIG. 12 is made of "S"-Glass/PEEK resilient strips 76 and conductive copper strips 78 in a manner analogous to that described above for the other antennae. UHF antenna 38 extends beyond antenna array element 32a. Resilient strips 76 of UHF antenna 38 are shaped in a manner analogous to resilient strips 44a–h of antenna array elements 32b and 34b. In the embodiment shown, conductive copper strips 78 form a right-handed quadrifilar helix about resilient strips 76. If desired, a left-handed quadrifilar helix could be formed instead. Coaxial feeds from feed holes 64i–l of boom segment 60c are soldered and bonded to the ends of the respective helical conductive copper strips 78.

UHF antenna 38 also includes an "S"-Glass/PEEK lenticular stiffener 80 bonded to the interior of UHF antenna 38. One end of lenticular stiffener 80 is attached to the end of boom segment 60c and functions as a bendable hinge. Lenticular stiffener 80 is attached to boom segment 60c, for example, by bolting. A curved spacer 81 made of PTFE facilitates this attachment by filling the space between the bottom of boom segment 60c and the top of lenticular stiffener 80. Thus, when antenna assembly 30 is stowed, the end of stiffener 80 near boom segment 60c is bent back so that stiffener 80 and antenna 38 are folded against helical structure 40. Upon being released for deployment, the resilient nature of stiffener 80 causes it to straighten out again so as to axially align stiffener 80 and boom segment 60c.

A PTFE distributed gravity gradient mass 82 is bonded to lenticular stiffener 80. Distributed gravity gradient mass 82 biases the satellite in a desired direction with respect to the Earth to facilitate attitude control of the spacecraft. Gravity gradient mass 82 is distributed along a length of stiffener 80 to be more easily supportable.

Alternatively, as shown schematically in FIG. 13, a boom segment 84 extends through and beyond UHF antenna 38. Unlike boom segments 60a–c, boom segment 84 is solid and made of a non-metallic, dielectric material such as Torlon, a polyamide-imide. As such, boom segment 84 does not require pop-up flaps. Boom segment 84 is supported by a hub and spoke arrangement (not shown) similar to those supporting boom segments 60a–c and is joined with boom segment 60c using strips 66a–d analogous to the strips connecting the other boom segments. An "S"-shaped actuator hold down bracket 86 can be integral with, or have one end bolted to, boom segment 84. Hold down bracket 86 is attached to a non-explosive actuator 112 more fully described below.

FIG. 14 depicts in cross-section antenna assembly 30 stowed within a spacecraft 114 prior to deployment. Antenna assembly 30 is folded at tape hinges 66 (illustrated schematically in FIG. 14) so that the antenna elements overlie one another. In this stowed position, UHF antenna 38, helical structures 40, 41 and 42 and their corresponding antennae are resiliently compressed to occupy a smaller thickness and thereby fit within the space between shelf 108 and solar array panel 100b. The end of boom 60 is attached to a 180° constant torque hinge 104. One suitable hinge is described in the co-pending U.S. patent application, the contents of which are hereby incorporated by reference, entitled "Shear Viscous Damped Hinge," Ser. No. 08/191, 246 filed Feb. 4, 1994, and assigned to the same assignee as the present invention. Antenna assembly 30 is disposed against a payload shelf 108. Solar array panels 100a and 100b are attached to spacecraft 114 via solar array hinges 102a and 102b. Solar array panels 100a and 100b form a top and bottom to spacecraft 114. A double lanyard non-explosive actuator (not shown) restrains solar array panels 100a and 100b during launch. Snubbers 106 provide for shock absorption during launch of the satellite.

When antenna assembly 30 is to be deployed, the double lanyard non-explosive actuator is released and solar array panels 100a and 100b pivot 90° about solar array hinges 102a and 102b. As solar array panel 100b is rotated, first phase deployment begins. Antenna assembly 30 springs out by a combination of: (1) the strain energy stored in antenna assembly 30 when it is partially flattened between solar array panel 100b and payload shelf 108; and (2) the urging of 180° constant torque hinge 104. At this point, lenticular stiffener 80 of UHF antenna 38 is held to boom segment 60a via a single lanyard non-explosive actuator 112 with a delrin spacer 110 holding lenticular stiffener 80 to non-explosive actuator 112. In the embodiment using boom segment 84 within UHF antenna 38, actuator hold down bracket 86 is attached directly to non-explosive actuator 112 and delrin spacer 110 is omitted.

Figure 15:
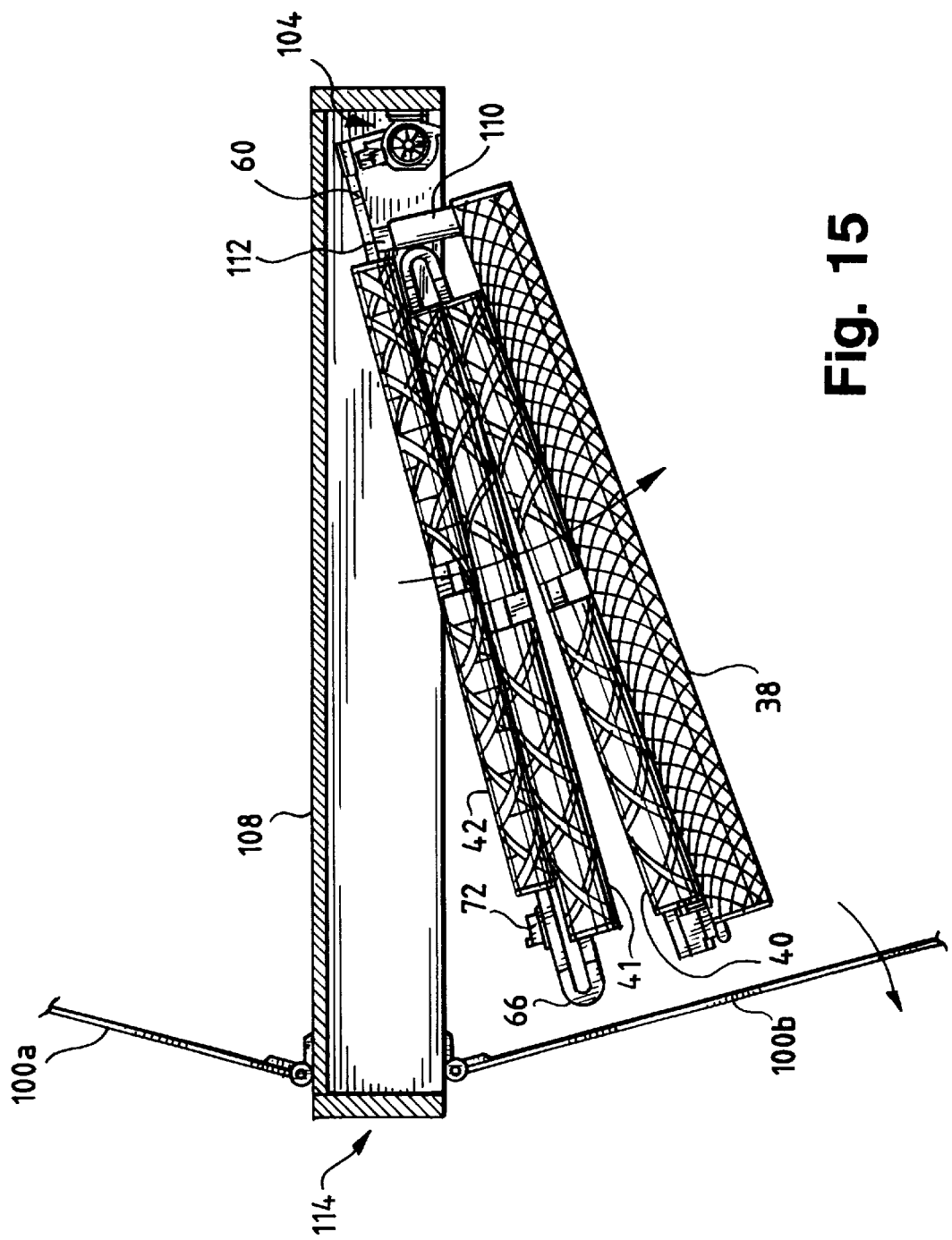
FIG. 15 is a section view of the antenna system of FIG. 14 beginning to deploy.
Figure 16:
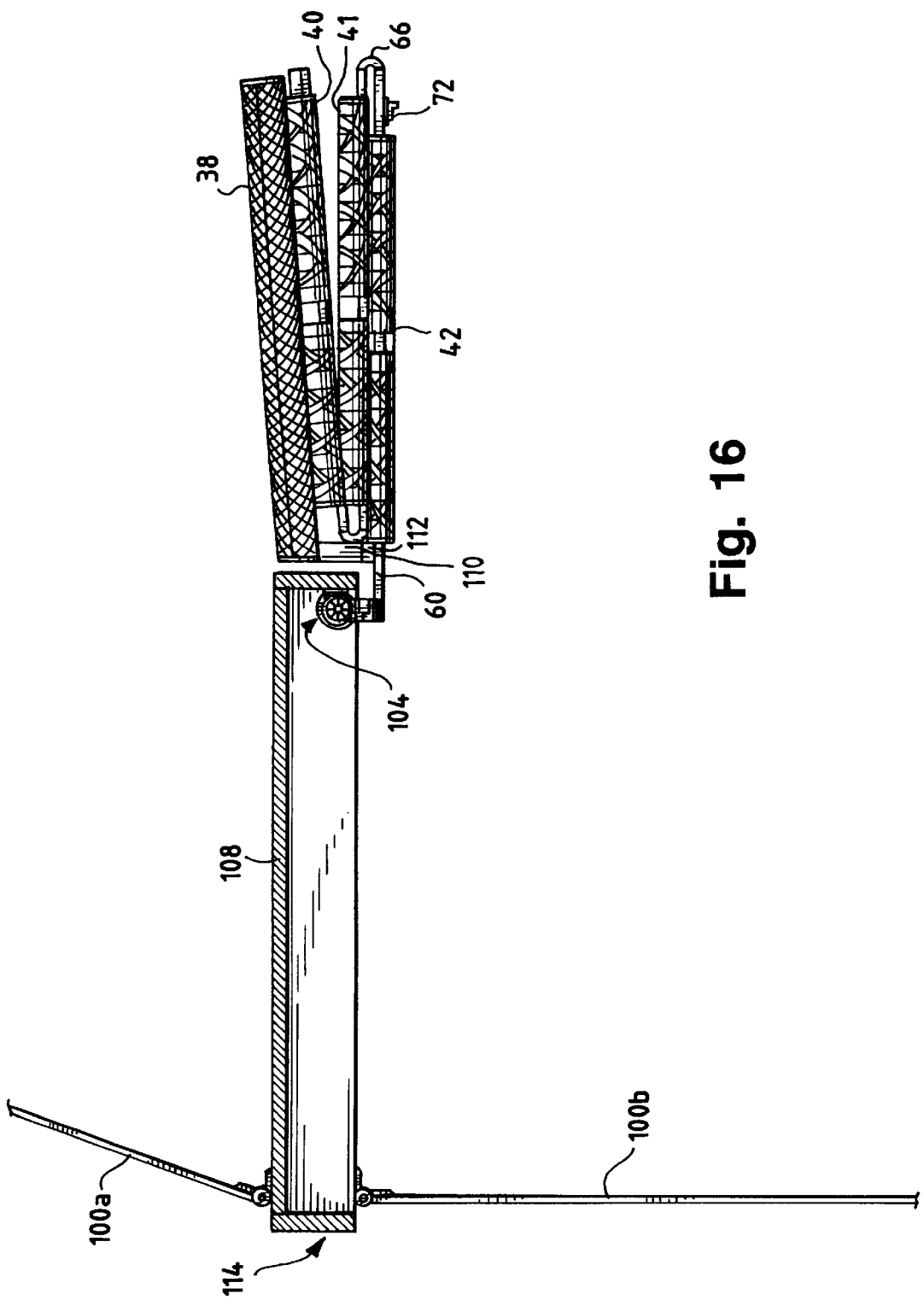
FIG. 16 is a section view of the antenna system of FIG. 14 in the process of deploying at a time after that shown in FIG. 15.

Thus, as shown in FIG. 15, when solar array panel 100b releases antenna assembly 30, antenna assembly 30 begins to pivot about torque hinge 104. Antenna assembly 30 will pivot 180° about constant torque hinge 104 to the location depicted in FIG. 16. When antenna assembly 30 has pivoted 180°, phase one deployment is complete.

At this point, a single lanyard non-explosive actuator 112 is released to begin phase two deployment. Non-explosive actuator 112 separates UHF antenna 38 from boom segment 60a. Antenna assembly 30 begins to unfold with the various antenna elements moving in the direction of the arrows shown in FIG. 17. Antenna assembly 30 continues to unfold until it reaches the deployed configuration shown in FIG. 4. Tape hinges 66 and lenticular stiffener 80 snap back into an axially aligned orientation. Not only does antenna assembly 30 unfold into alignment, each helical element of antenna assembly 30 springs back to a shape having a substantially circular cross-section. This return to shape allows the various antennae of antenna assembly 30 to operate.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method of making a resilient, flexible helical structure, comprising the steps of:
   (a) joining at least one flexible support strip to at least one flexible conductive strip;
   (b) attaching one end of the at least one joined support strip and conductive strip to a first ring;
   (c) wrapping the at least one joined support strip and conductive strip around a mandrel to form at least one helical strip;
   (d) attaching a second end of the at least one helical strip to a second ring to form the helical structure;
   (e) treating the helical structure so that it will retain its shape and be resiliently compressible in a direction perpendicular to its longitudinal axis; and
   (f) removing the helical structure from the mandrel.

2. The method of claim 1 further comprising the step of attaching at least one intermediate ring to the at least one helical strip.

3. The method of claim 1 wherein said treating of said helical structure comprises heating said helical structure while said helical structure is around said mandrel.

4. The method of claim 1 wherein said treating step further comprises treating the helical structure so that it is stowable in a first, coiled configuration with the at least one helical strip coiled about the first ring and with the second ring positioned on the outside of the coil and in which energy is stored in the at least one coiled, resilient helical strip so that the helical structure is self-deployable by the release of the energy stored in the at least one coiled, resilient helical strip into a second, extended boom configuration with the first ring and the second ring positioned at opposite ends thereof.

5. A self-deploying helical structure, comprising:
   a plurality of resilient helical strips;
   a top ring attached to support one end of each said helical strip; and
   a bottom ring attached to support a second end of each said helical strip;
   wherein the helical structure is stowable in a first, coiled configuration with said helical strips coiled about said top ring and with said bottom ring positioned on the outside of the coil and in which energy is stored in said coiled, resilient helical strips; and
   wherein the helical structure is self-deployable by the release of the energy stored in said coiled, resilient helical strips into a second, extended boom configuration with said top ring and said bottom ring positioned at opposite ends thereof.

6. The self-deploying helical structure of claim 5 wherein said helical strips are resiliently compressible in a direction perpendicular to the longitudinal axis of the helical structure.

7. A self-deploying helical antenna, comprising:
   a plurality of resilient helical strips;
   a top ring attached to support one end of each said helical strip;
   a bottom ring attached to support a second end of each said helical strip; and
   at least one conductive strip, each said conductive strip having substantially its entire length bonded to at least one of said resilient helical strips;
   wherein the helical antenna is stowable in a first, coiled configuration with said helical strips coiled about said top ring and with said bottom ring positioned on the outside of the coil and in which energy is stored in said coiled, resilient helical strips; and
   wherein the helical antenna is self-deployable by the release of the energy stored in said coiled, resilient helical strips into a second, extended boom configuration with said top ring and said bottom ring positioned at opposite ends thereof.

8. The self-deploying helical antenna of claim 7 wherein said helical strips are resiliently compressible in a direction perpendicular to the longitudinal axis of the helical antenna.

9. A self-deploying solar sail, comprising:
   a plurality of resilient helical strips;
   a top ring attached to support one end of each said helical strip;
   a bottom ring attached to support a second end of each said helical strip; and
   gathering means for receiving solar energy, said gathering means being attached to said helical strips;
   wherein the solar sail is stowable in a first, coiled configuration with said helical strips coiled about said top ring and with said bottom ring positioned on the outside of the coil and in which energy is stored in said coiled, resilient helical strips; and
   wherein the solar sail is self-deployable by the release of the energy stored in said coiled, resilient helical strips into a second, extended boom configuration with said top ring and said bottom ring positioned at opposite ends thereof.

10. The self-deploying solar sail of claim 9 wherein said helical strips are resiliently compressible in a direction perpendicular to the longitudinal axis of the solar sail.

11. A method of making a resilient, flexible helical structure, comprising the steps of:
    (a) joining at least one flexible support strip to at least one flexible conduct ive strip;
    (b) attaching one end of the at least one joined support strip and conductive strip to a first ring;
    (c) wrapping the at least one joined support strip and conductive strip around a mandrel to form at least one helical strip;
    (d) attaching a second end of the at least one helical strip to a second ring to form the helical structure;
    (e) treating the helical structure so that it is stowable in a first, coiled configuration with the at least one helical strip coiled about the first ring and with the second ring positioned on the outside of the coil and in which energy is stored in the at least one coiled, resilient helical strip so that the helical structure is self-deployable by the release of the energy stored in the at least one coiled, resilient helical strip into a second, extended boom configuration with the first ring and the second ring positioned at opposite ends thereof; and (f) removing the helical structure from the mandrel.

12. The method of claim 11 wherein said treating step further comprises treating the helical structure so that it will retain its shape and so that the at least one helical strip is resiliently compressible in a direction perpendicular to the longitudinal axis of the helical structure.

13. A compressible helical stricture, comprising:

a plurality of resilient helical strips;

a top ring attached to support one end of each said helical strip;

a bottom ring attached to support a second end of each said helical strip; and a plurality of copper strips, each said copper strip having substantially its entire length attached to at least one of said resilient helical strips;

wherein the helical structure is stowable in a first, coiled configuration with said helical strips coiled about said top ring and with said bottom ring positioned on the outside of the coil and in which energy is stored in said coiled, resilient helical strips; and wherein the helical structure is self-deployable by the release of the energy stored in said coiled, resilient helical strips into a second, extended boom configuration with said top ring and said bottom ring positioned at opposite ends thereof.

14. The compressible helical structure of claim 13 wherein said helical strips are resiliently compressible in a direction perpendicular to the longitudinal axis of the helical structure.

15. A self-deploying helical structure, comprising:

a plurality of resilient helical strips;

a top ring attached to support one end of each said helical strip; and a bottom ring attached to support a second end of each said helical strip;

wherein said helical strips are resiliently compressible in a direction perpendicular to the longitudinal axis of the helical structure; and wherein said top ring and said bottom ring are resiliently compressible in a direction perpendicular to the longitudinal axis of the helical structure.

16. The helical structure of claim 15 further comprising a plurality of intermediate rings attached to support said helical strips between said top ring and said bottom ring, wherein said intermediate rings are resiliently compressible in a direction perpendicular to the longitudinal axis of the helical structure.

* * * * *